United States Patent [19]

Terui et al.

[11] Patent Number: 4,697,907
[45] Date of Patent: Oct. 6, 1987

[54] FLASH PHOTOGRAPHING SYSTEM

[75] Inventors: Nobuhiko Terui, Tokyo; Nobuyoshi Hagiuda, Kawasaki, both of Japan

[73] Assignee: Nippon Kogaku K.K., Tokyo, Japan

[21] Appl. No.: 948,438

[22] Filed: Dec. 30, 1986

Related U.S. Application Data

[63] Continuation of Ser. No. 821,762, Jan. 23, 1986, abandoned.

[30] Foreign Application Priority Data

Jan. 30, 1985 [JP] Japan .................................. 60-15796

[51] Int. Cl.[4] ........................................... G03B 15/05
[52] U.S. Cl. ................................. 354/416; 315/241 P
[58] Field of Search ...................................... 354/145.1

[56] References Cited

U.S. PATENT DOCUMENTS 4,189,219 2/1980 Hasegawa et al. .................. 354/416
4,363,542 12/1982 Kondo et al. ....................... 354/416
4,436,396 3/1984 Maida ................................. 354/416

Primary Examiner—W. B. Perkey
Attorney, Agent, or Firm—Shapiro and Shapiro

[57] ABSTRACT

In a flash photographing system including a camera having a light output control circuit for producing a stop of light emission signal when a light intensity of an illumination light reflected by an object reaches a predetermined level and a start circuit to start activation of the light output control circuit in response to a start of light emission signal, and a flash device electrically connected to the camera and having a flash bulb for emitting the illumination light, the flash device comprises detection means for detecting electrical connection with the camera, start of light emission signal generating means responsive to the detection means for supplying the start of light emission signal to the start circuit of the camera in synchronism with the emission of the illumination light by the flash bulb, and light emission stop means for stopping the emission of the illumination light by the flash bulb in response to the stop of light emission signal from the light output control circuit of the camera.

15 Claims, 3 Drawing Figures

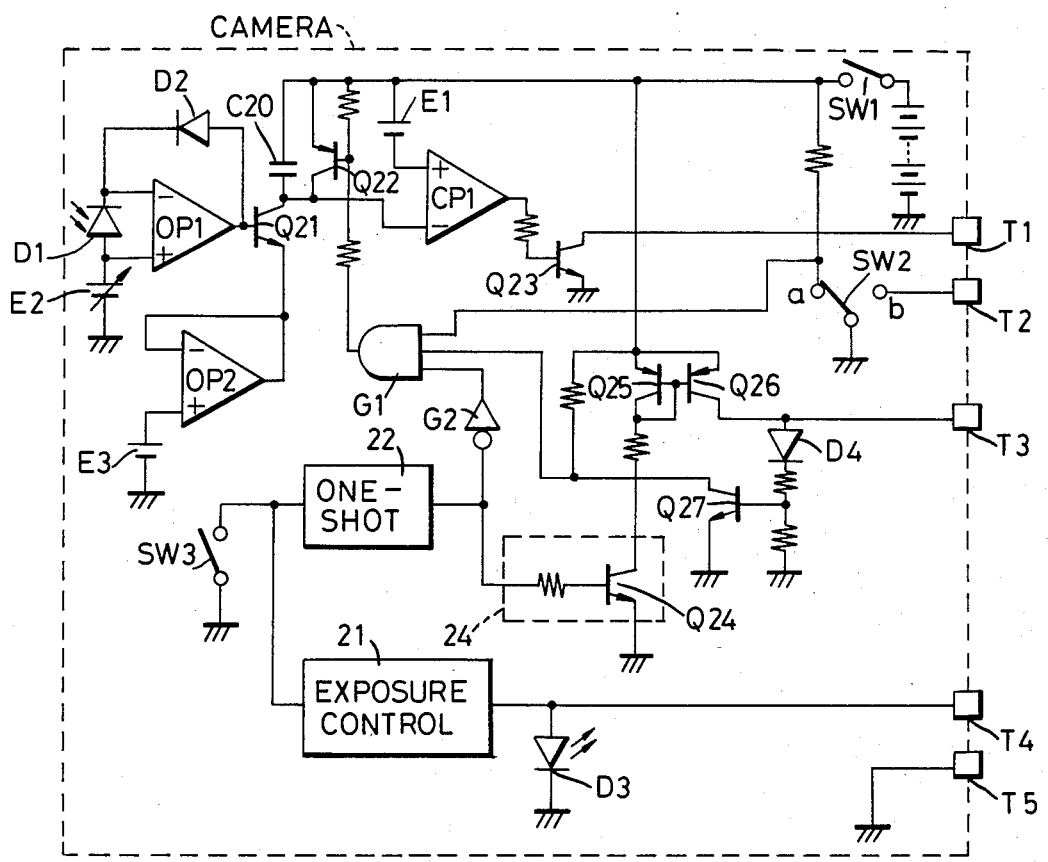
F I G. 2

FLASH PHOTOGRAPHING SYSTEM

This is a continuation application of Ser. No. 821,762 filed Jan. 23, 1986, now abandoned.

BACKGROUND OF THE INVENTION

1. Field of the Invention

The present invention relates to a flash photographing system, and more particularly to an automatic light output controlable flash device.

2. Description of the Prior Art

An electronic flash device in which light exposure to an object is initiated in synchronism with a full-open state of an exposure aperture, an illumination light reflected by the object and transmitted through an imaging lens of a camera is measured by an automatic light output control circuit in the camera and light emission of a flash bulb is stopped when an integrated value of a photo-current of a photo-sensor of the automatic light output control circuit reaches a predetermined level, has been known.

There are two methods for the automatic light output control circuit to initiate the integration of the light reflected by the object. In a first method, a voltage change in the circuit when the flash bulb starts to emit the light is detected to synchronize the start of the integration of the light output control circuit to the voltage change. In a second method, the light output control circuit is activated by a mechanical switch in synchronism with the full-open state of the aperture of a shutter of the camera.

However, there is no interchangeability between a first type of camera which adopts the first method and a second type of camera which adopts the second method. In the second method which uses the mechanical switch, it is difficult for the automatic light output control circuit to operate in synchronism with the full-open state of the aperture and the automatic light output control circuit starts the integration before the flash device actually emits the light. As a result, a proper exposure is not attained by an effect of an external light in a daylight synchronization photographing.

SUMMARY OF THE INVENTION

It is an object of the present invention to provide a flash device which is interchangeable between cameras having different start times of integration by an automatic light output control circuit.

BRIEF DESCRIPTION OF THE DRAWINGS

FIG. 2 shows a circuit diagram of an embodiment of a camera of the present invention.

DESCRIPTION OF THE PREFERRED EMBODIMENTS

Figure 1:
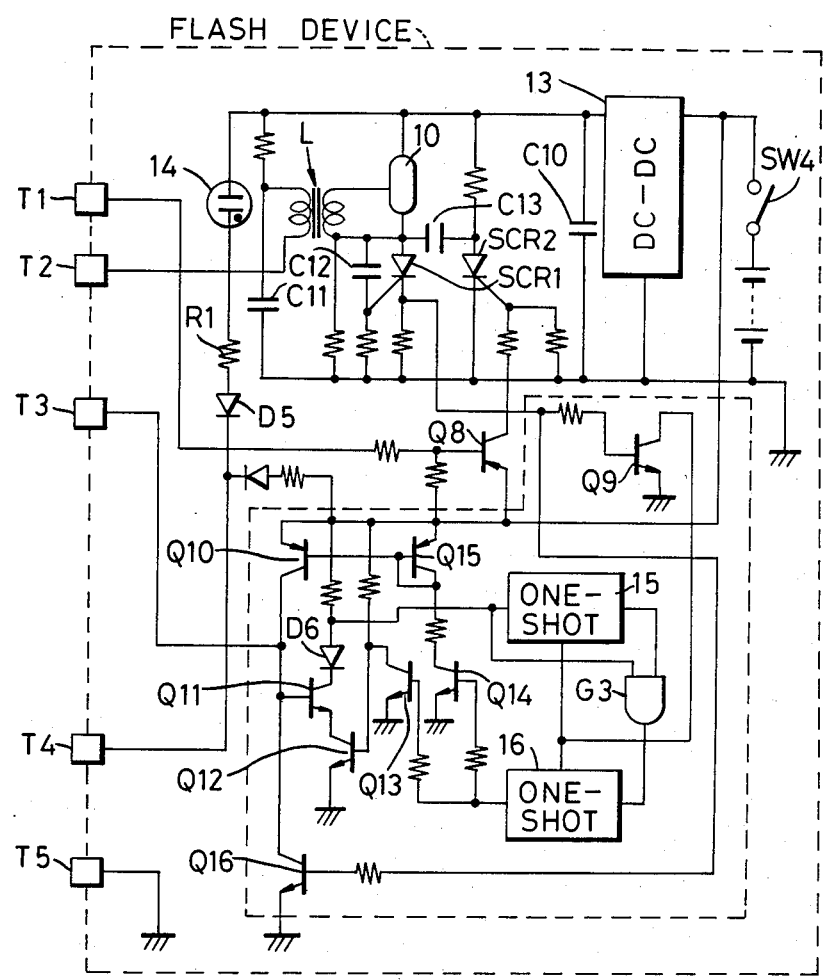
FIG. 1 shows a circuit diagram of an embodiment of an electronic flash device of the present invention.

FIG. 1 shows a circuit diagram of an embodiment of an electronic flash device of the present invention, and FIG. 2 shows a circuit diagram of a camera.

The electronic flash device of FIG. 1 is electrically connected to the camera of FIG. 2 through connecting terminals T1 to T5. A DC-DC converter 13 steps up a power supply voltage to a voltage which enables a flash bulb 10 to emit a light and charges up a main capacitor C10. When the charge-up of the main capacitor C10 is completed, a neon tube 14 is fired and a voltage is developed at the terminal T4 through a resistor R1 and a diode D5.

A primary winding of a trigger transformer L is connected between the terminal T2 and a trigger capacitor C11, and a secondary winding is connected to a gate of main thyristor SCR1 through a capacitor C12. Accordingly, when the terminal T2 assumes an L-level, the flash bulb 10 is triggered and starts to emits a light. A commutator circuit having a capacitor C13 and a thyristor SCR2 is connected to the junction of the flash bulb 10 and the SCR1. The commutator circuit is controlled by a transistor Q8 having a base thereof connected to the terminal T1 to stop the light emission of the flash bulb 10. A collector of a transistor Q9 having a base thereof connected to a cathode of SCR1 is connected to one-shot multivibrators 15 and 16. As a current flows through SCR1, the transistor Q9 is turned on to reset the one-shot multivibrators 15 and 16 so that the outputs thereof assumes an H-level and an L-level, respectively. Input and output terminals of the one-shot multivibrator 15 are connected to two input terminals of an AND gate G3, and an output terminal of the AND gate G3 is connected to an input terminal of the one-shot multivibrator 16. An output terminal of the one-shot multivibrator 16 is connected to bases of the transistors Q13 and Q14.

The input terminal of the one-shot multivibrator 15 is connected to a collector of a transistor Q11 through a diode D6, a base of the transistor Q11 is connected to the terminal T3 and to a collector of a transistor Q16. A collector of the transistor Q14 is connected to a collector of the transistor Q15 through a resistor.

The transistor Q11 constitutes a detection circuit to detect a type of a camera coupled to the flash device. The transistors Q15 and Q10 constitute a current mirror circuit. While the transistor Q14 is ON, the transistor Q10 supplies a constant current from its collector to the terminal T3.

In the present embodiment, a control circuit which generates a signal representing the start of light emission by the flash bulb 10 control the start of the light output control of the camera is constituted by the one-shot multivibrators 15 and 16, AND gate G3 and transistors Q10, Q13, Q14 and Q15. The signal from the control circuit is supplied to the camera through the terminal T3.

The camera circuit of FIG. 2 is now explained. The camera shown is of the first type which has an automatic light output control circuit which responds to the start of light emission signal generated by the flash device in synchronism with the light emission of the flash bulb. A photo-diode D1 is an automatic light output controlling photo-sensing element which senses a light reflected by a film surface. The photo-diode D1 has its cathode and anode connected to an inverting terminal and a non-inverting terminal of an operational amplifier OP1. A variable power supply E2 generates a voltage corresponding to a film sensitivity and is connected across the non-inverting terminal of the operational amplifier OP1 and ground. The operational amplifier OP1 constitutes a negative feedback circuit through a diode D2 a combination of the film sensitivity and a photo-current is produced at an output of the operational amplifier OP1. A base of a transistor Q1 is connected to the output terminal of the operational amplifier OP1, and an output terminal of a voltage follower OP2 is connected to an emitter of the transistor Q21. A non-inverting terminal of the voltage follower OP2 is fixed to a potential of a reference voltage E3. A collector of the transistor Q21 is connected to a photocurrent integrating capacitor C20.

A transistor Q22 is turned off when an output of an AND gate G1 assumes the H-level to start charging of the integrating capacitor C20. When the voltage across the capacitor C20 is equal to or larger than the reference voltage E1, a comparator CP1 produces an H-level signal to turn on a transistor Q23 connected to an output terminal thereof through a resistor. A collector of the transistor Q23 is connected to the flash device through the terminal T1.

A known synchronous switch SW2 which is linked to a shutter device (not shown) is switched from a terminal a to a terminal b when a shutter aperture is fully opened to apply the H-level to one input of the AND gate G1 so that the terminal T2 is grounded.

In a non-flash photographing mode, an exposure control circuit 21 controls exposure of the camera in accordance with a photographing condition (shutter speed, stop value, etc.). When the electronic flash device is mounted and the charging of the main capacitor C10 in FIG. 1 is completed and a voltage is developed at the terminal T4, the exposure control circuit 21 sets the shutter speed to one suitable for the flash photographing, for example, a shutter speed slower than 1/125 second and carries out a series of exposure control operations in response to the turn-on of a release switch SW3.

When the release switch SW3 is turned on, an output of a one-shot multivibrator 22 is switched from the H-level to the L-level for a predetermined time interval. An output terminal of the one-shot multivibrator is connected to an input terminal of the AND gate G1 through an inverter G2 and also connected to a base of a transistor Q24 through a resistor. The circuit including the transistor Q24 functions to generates an L-level output signal for a predetermined time interval from the turn-on of the release switch SW3 to indicate that the camera is of the first type. Transistors Q25 and Q26 constitute a current mirror circuit. A collector of the transistor Q26 is connected to the control terminal T3 and to a base of a transistor Q27 through a diode D4. A collector of the transistor Q27 is connected to an input terminal of the AND gate G1. When the constant current is normally supplied and nothing is connected to the terminal T3, the transistor Q27 conducts. The terminal T5 is grounded.

An operation when the electronic flash device of FIG. 1 is mounted on the camera of FIG. 2 is explained with reference to a time chart of FIG. 3.

When the power switch SWI of the camera is turned on, the power is supplied to the circuit and the one-shot multivibrator 22 produces the H-level signal to turn on the transistor Q24. When the power switch SW4 of the flash device is turned on, the transistor Q12 is turned on. As the transistor Q24 is turned on, the current mirror circuit comprising the transistors Q25 and Q26 is activated to turn on the transistor Q11 of the flash device through the terminal T3. A sum of the base-emitter voltage of the transistor Q27 of the camera and the forward voltage of the diode D4 is selected to be larger than the voltage at the terminal T3 so that the transistor Q27 is kept off. As a result, the collector voltage of the transistor Q27 is at the H-level. The voltage at the terminal T3 is a sum of the base-emitter voltage of the transistor Q11 and the saturation voltage of the transistor Q12.

The movable contact of the synchronous switch SW2 is connected to the terminal a and the output of the AND gate G1 is at the L-level. Accordingly, the transistor Q22 conducts to short the capacitor C20.

When the power switch of the flash device of FIG. 1 is turned on and the DC-DC converter 13 is activated to charge up the main capacitor C10, the neon tube 14 is fired and the current flows into the exposure control circuit 21 of the camera through the terminal T4. As a result, the control circuit 21 sets the shutter speed to one suitable for the flash photographing.

Figure 3:
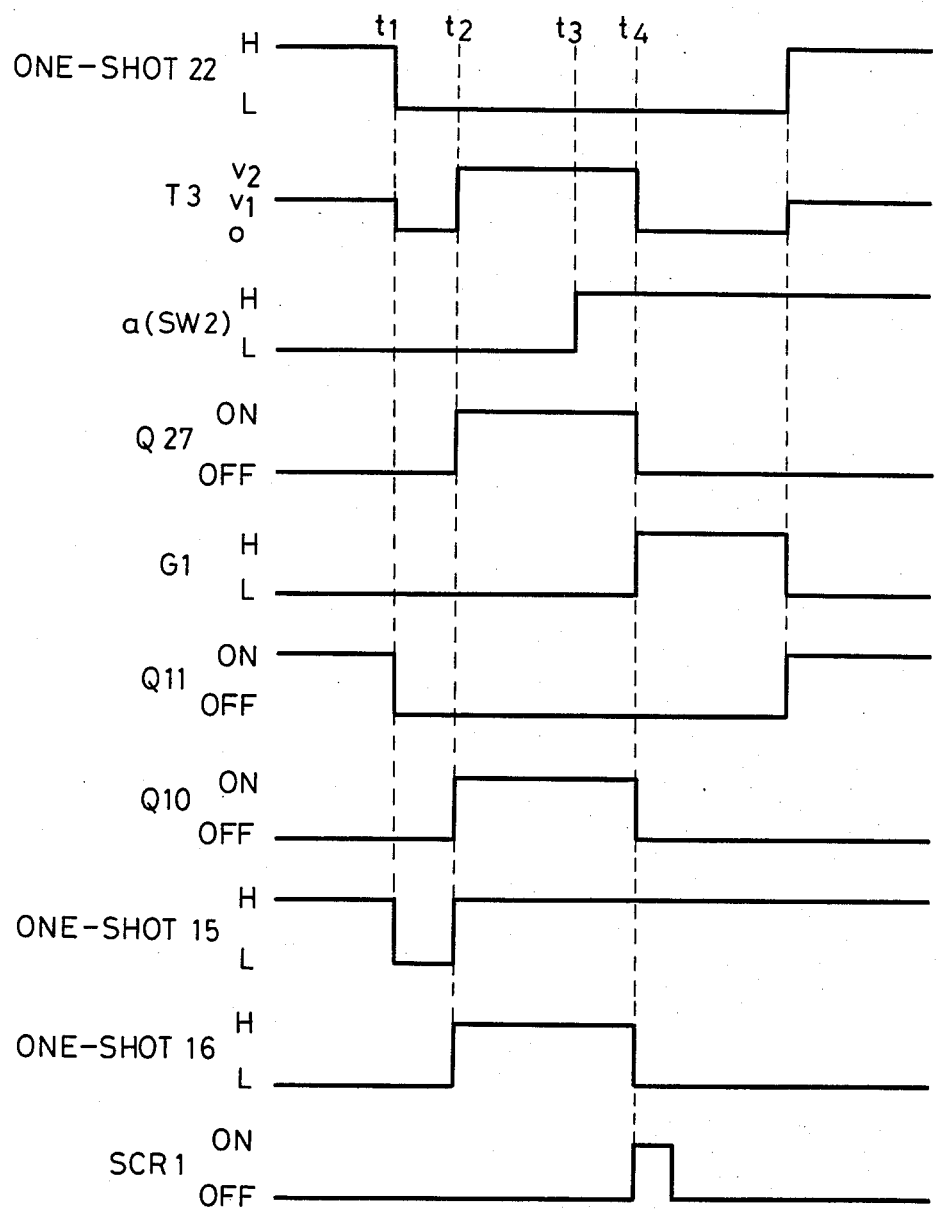
FIG. 3 is a timing chart for the electronic flash device and the camera.

When a release button or lever (not shown) is activated, the release switch SW3 is closed at a time point t1 shown in FIG. 3 to render the output of the one-shot multivibrator 22 to the L-level. The L-level output of the one-shot multivibrator 22 is inverted to the H-level signal by the inverter G2, and it is supplied to the AND gate G1 and turns off the transistor Q24 and the current mirror circuit. Accordingly, the terminal T3 changes from voltage V1 to voltage 0 at the time point t1 and the L-level release signal is generated by the camera to the flash device. The release signal is detected by the transistor Q11. The transistor Q11 is turned off by the release signal to supply the H-level to the one-shot multivibrator 15. Thus, the output of the one-shot multivibrator 15 assumes the L-level for the predetermined time interval and then assumes the H-level, as shown in FIG. 3. Accordingly, the output of the AND gate G3 changes from the L-level to the H-level after the predetermined time interval as does the output of the one-shot multivibrator 15. As a result, the output of the one-shot multivibrator 16 changes from the L-level to the H-level at a time point t2 and the transistors Q13 and Q14 are turned on.

As the transistor Q14 is turned on, the current mirror circuit (transistors Q10 and Q15) is activated so that the collector current of the transistor Q10 flows at the time point t2. Since the transistor Q16 is now off and the transistor Q13 is on, the transistor Q12 is off and the collector current of the transistor Q10 flows into the circuit of the camera through the terminal T3 as a first control signal.

By virtue of the first control signal, the voltage at the terminal T3 assumes a voltage V2 which is larger than the voltage V1. The voltage V2 is selected to be larger than the sum of the base-emitter voltage of the transistor Q27 and the forward voltage V4 of the diode D4. Accordingly, the transistor Q27 is turned on to render the input of the AND gate G1 to the L-level.

The first control signal activates the transistor Q22 which shorts the capacitor C20 to maintain the light output control circuit deactivated. This condition is maintained until the start of light emission signal is generated from the flash device through the terminal T3.

At a time point t3 delayed from the turn-on of the release switch SW3 at the time point t1, the exposure aperture of the camera is fully opened. In synchronism thereto, the movable contact of the switch SW2 is switched from the terminal a to the terminal b and the input to the AND gate G1 changes to the H-level. After a delay time from the time point t3 to a time point t4 due to the switching of the switch SW2, the terminal T2 assumes the L-level and the charge stored in the capacitor C11 flows into the primary winding of the trigger transformer L of the flash device so that a high voltage is generated in the secondary winding and the thyristor SCRI is turned on to cause the flash bulb 10 to emit a light.

In synchronism with the start of light emission at the time t4, the transistors Q9 and Q16 are turned on to reset the one-shot multivibrators 15 and 16 and render the terminal T3 to the voltage 0. Thus, the L-level start of light emission signal is generated at the terminal T3. As the terminal T3 assumes the L-level, the transistor Q27 is turned off and the input to the AND gate G1 is changed to the H-level. Accordingly, all of the three inputs to the AND gate G1 assume the H-level in synchronism with the start of light emission and the AND gate G1 produces the H-level signal, which turns off the transistor Q22 and activates the light output control circuit, which starts charging of the integrating capacitor C20.

The light output control circuit is not activated during the time period from the time point t3 at which the exposure aperture is fully opened to the time point at which the light emission is actually started.

When the voltage of the integrating capacitor C20 reaches the predetermined level, the output of the comparator CPI changes to the H-level to turn off the transistor Q23 to render the terminal T1 to the L-level.

As the terminal T1 assumes the L-level, the transistor Q8 of the flash device is turned on and the commutator thyristor SCR2 is turned on. As a result, the charge stored in the commutator capacitor C13 is discharged to stop the light emission of the flash bulb 10.

By removing the circuit 24 from the camera shown in FIG. 2, the second type of camera is provided, in which the light output control is started in response to the synchronous switch which is actuated when the exposure aperture is fully opened. In this case, the collector of the transistor Q25 is grounded through a resistor. Accordingly, in spite of the actuation of the release switch SW3 and the activation of the one-shot multivibrator 22, the collector current of the transistor Q26 always flows into the base of the transistor Q11 of the flash device through the terminal T3 so that the transistor Q11 is not turned off. As a result, the release signal from the camera is not supplied to the flash device. The transistor Q27 is normally non-conductive and supplies the H-level signal to the AND gate G1. Accordingly, in synchronism with the switching of the switch SW2 from the contact a to the contact b due to the full-open state of the exposure aperture, the AND gate G1 produces the H-level signal to turn off the transistor Q22 to allow charging of the integrating capacitor C20.

The flash device of the present embodiment thus fits to the second type of camera to enable the flash photographing by the combination thereof.

We claim:

1. A flash device in a flash photographing system including a camera having a light output control circuit for producing a stop of light emission signal when a light intensity of an illumination light reflected by an object reaches a predetermined level and a start circuit to start activation of said light output control circuit in response to a start of light emission signal, and a flash device electrically connected to said camera and having a flash bulb for emitting the illumination light, comprising:

detection means for detecting electrical connection with said camera, start of light emission signal generating means responsive to said detection means for supplying said start of light emission signal to said start circuit of said camera in synchronism with the emission of the illumination light by said flash bulb; and light emission stop means for stopping the emission of the illumination light by said flash bulb in response to the stop of light emission signal from said light output control circuit of said camera.

2. A flash device according to claim 1 wherein said camera further includes electrical terminal means for electrical connection with said flash device and means for supplying signal voltages to said electrical terminal means, said flash device further comprises electrical terminal means to be connected to said electrical terminal means of said camera, and said detection means detects said signal voltages through said electrical terminal means of said camera and said flash device.

3. A flash device according to claim 2 wherein said camera further includes release means to be actuated to start photographing, and said signal voltage supply means generates one of the signal voltages in response to said release means.

4. A flash device according to claim 2 wherein said electrical terminal means of said camera has a plurality of terminals including a control terminal connected to said signal voltage supply means, and said electrical terminal means of said flash device has a plurality of terminals including a control terminal connected to said detection means, whereby the control terminals of said camera and said flash device are interconnected.

5. A flash device according to claim 4 wherein said control terminal of said camera is connected to said start circuit, and said control terminal of said flash device is connected to said start of light emission signal generating means.

6. A flash device according to claim 5 wherein said start of light emission signal has a different level of voltage than that of said signal voltages and is supplied to said start circuit through said control terminals of said flash device and said camera.

7. A flash device having a flash bulb for emitting an illumination light and electrically connected to a camera having a light output control circuit for producing a stop signal when a light amount of the illumination light refected by an object reaches a predetermined level and a start circuit to start activation of said light output control circuit in response to a start signal, said flash device comprising:

detection means for detecting electrical connection with said camera;

means for generating said start signal responsive to said detection means for supplying said start signal to said start circuit of said camera in synchronism with the emission of the illumination light by said flash bulb; and light emission stop means for stopping the emission of the illumination light by said flash bulb in response to said stop signal from said light output control circuit of said camera.

8. A flash device according to claim 7 wherein said camera further includes electrical terminal means for electrical connection with said flash device and means for supplying signal voltages to said electrical terminal means, said flash device further comprises electrical terminal means to be connected to said electrical terminal means of said camera, and said detection means detects said signal voltages through said electrical terminal means of said camera and said flash device.

9. A flash device according to claim 8 wherein said camera further includes release means to be actuated to start photographing, and said signal voltage supplying means generates one of the signal voltages in response to said release means.

10. A flash device according to claim 8 wherein said electrical terminal means of said camera has a plurality of terminals including a control terminal connected to said signal voltage supplying means, and said electrical terminal means of said flash device has a plurality of terminals including a control terminal connected to said detection means, whereby the control terminals of said camera and said flash device are interconnected.

11. A flash device according to claim 10 wherein said control terminal of said camera is connected to said start circuit, and said control terminal of said flash device is connected to said start signal generating means.

12. A flash device acccording to claim 11 wherein said start signal has a different level of voltage than that of said signal voltages and is supplied to said start circuit through said control terminals of said flash device and said camera.

13. A flash device having a flash bulb for emitting an illumination light and a control terminal connected either to a first terminal of a first camera provided with first light output control means for determining the termination of the emission of said flash bulb on the basis of a light emission starting signal supplied from said first termination or to a second terminal of a second camera provided with second light output control means for determining the termination of the emission of said flash bulb on the basis of the operation of a shutter mechanism of said second camera, said flash device comprising:

means for discriminating between a first connection in which said flash device is connected to said first camera and a second connection in which said flash device is connected to said second camera;

means for producing said light emission starting signal at said control terminal to operate said first light output control means; and means for controlling said light emission starting signal roducing mans so that said light emission starting signal is supplied to said first camera through said control-terminal and said first terminal when said discriminating means discriminates said first connection, and so that said light emission starting signal is not supplied to said control terminal when said discriminating means discriminates said second connection.

14. A flash device according to claim 13 wherein said discriminating means discriminates between the first connection in which said control terminal is connected to said first terminal and the second connection in which said control terminal is connected to said second terminal.

15. A flash device according to claim 14 wherein said first camera has means for applying a discrimination signal at said first terminal and said discriminating means detects said discrimination signal through said first terminal to discriminate said first camera.

* * * * *